(12) United States Patent
Enda (10) Patent No.: US 6,382,651 B1
(45) Date of Patent: May 7, 2002

(54) SEAT FOR BICYCLE (75) Inventor: Ryuichi Enda, Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 934 days.

(21) Appl. No.: 08/609,381

(22) Filed: Mar. 1, 1996

(30) Foreign Application Priority Data

Mar. 3, 1995 (JP) ............................................. 7-044156

(51) Int. Cl.[7] ................................................ B62H 1/24
(52) U.S. Cl. ................. 280/288.4; 180/68.5; 297/195.1
(58) Field of Search ............................... 180/68.5, 65.1, 180/205, 220; 280/288.4; 297/195.1, 188.1, 336

(56) References Cited

U.S. PATENT DOCUMENTS

| | | | |
|---|---|---|---|
| 4,108,462 A | | 8/1978 | Martin |
| 5,297,846 A | | 3/1994 | Rafter |
| 5,328,240 A | * | 7/1994 | Neumuller ........... 297/195.1 X |
| 5,482,345 A | * | 1/1996 | Bolsworth et al. ...... 297/336 X |
| 5,562,322 A | * | 10/1996 | Christoffel .............. 297/336 X |

FOREIGN PATENT DOCUMENTS

| | | | | |
|---|---|---|---|---|
| FR | 809852 | * | 3/1937 | ............. 297/195.1 |
| GB | 408954 | * | 4/1934 | ............. 297/195.1 |
| JP | 6270867 | | 9/1924 | |
| JP | 06270867 | | 9/1994 | |

OTHER PUBLICATIONS

European Search Report dated Jul. 5, 1996.

* cited by examiner

*Primary Examiner*—Pam Rodriguez
(74) *Attorney, Agent, or Firm*—Ernest A. Beutler (57) ABSTRACT

A foldable or pivotal seat assembly for a power assisted vehicle, such as a bicycle, wherein the latching mechanism for retaining the seat in its retained position is carried by the seat so as to be moved free of the battery case during servicing.

19 Claims, 6 Drawing Sheets

SEAT FOR BICYCLE

BACKGROUND OF THE INVENTION

This invention relates to a seat for a vehicle and more particularly to an improved seat for an electrical power-assisted vehicle, such as a bicycle.

There has been proposed a class of vehicles wherein the vehicle is powered at least in part by an electric motor and wherein the vehicle is quite compact and small, such as a bicycle or the like. With these types of vehicles, the electric motor may either provide the full power for the vehicle or, more commonly, may provide an assist power to assist the rider under at least some riding circumstances.

Obviously, batteries must be provided for powering the electric motor. These batteries require servicing, such as recharging or replacement, and thus must be mounted in such a way that they can be conveniently accessed. It is also desirable if the batteries can be completely removed from the vehicle so that they can be taken to a place where they can be charged.

The batteries also have considerable bulk. Therefore, in order to avoid intrusion on the other components of the vehicle, it has been proposed to mount the batteries in a case that is positioned at least in substantial part beneath the rider's seat. The rider's seat has been mounted in such a way that it can be pivoted or moved away from the battery case so as to facilitate insertion of and removal of the batteries. In one type of the previously proposed arrangement of this type have incorporated latching mechanisms which are mounted at least in substantial part on the seat post, and thus do not move away from the battery case, even when the seat is moved. Thus, access to the battery is still somewhat restricted.

In another type of prior art construction, the seat post itself incorporates a pivoted joint which permits the upper portion of the post and attached seat to pivot as a unit to access the battery. Although such an arrangement facilitates battery access, it compromises the adjustment of the seat. This is because the post joint must be maintained in the seat pillar of the frame when the bicycle is ridden. This severely limits the degree of upward seat adjustment.

It is, therefore, a principal object of this invention to provide an improved pivotally mounted seat and latching mechanism therefor for such vehicles.

It is a further object of this invention to provide an improved, compact, pivotally supported vehicle seat wherein the latching mechanism is carried in major portion by the seat so as to also be moved free of the battery when the seat is in its released position.

It is a yet further object of this invention to provide an improved latching mechanism for a pivotally supported vehicle seat.

SUMMARY OF THE INVENTION

This invention relates to a pivoted saddle-type seat for a vehicle having a seat post. A first bracket is affixed to an upper end of the seat post. A second bracket is supported by the first bracket for pivotal movement about a first pivot axis by the first bracket. The first pivot axis extends transversely to the seat post. A saddle-type seat is fixed relative to the second bracket. A latching mechanism cooperates between the first and second brackets for latching the seat in its position. This latching mechanism includes a fixed latching member carried by the first bracket and a second, releasably movable, cooperating latching member that is carried by the second bracket and which engages the first latching member for holding the seat in its latched position.

DETAILED DESCRIPTION OF THE PREFERRED EMBODIMENTS OF THE INVENTION

Figure 1:
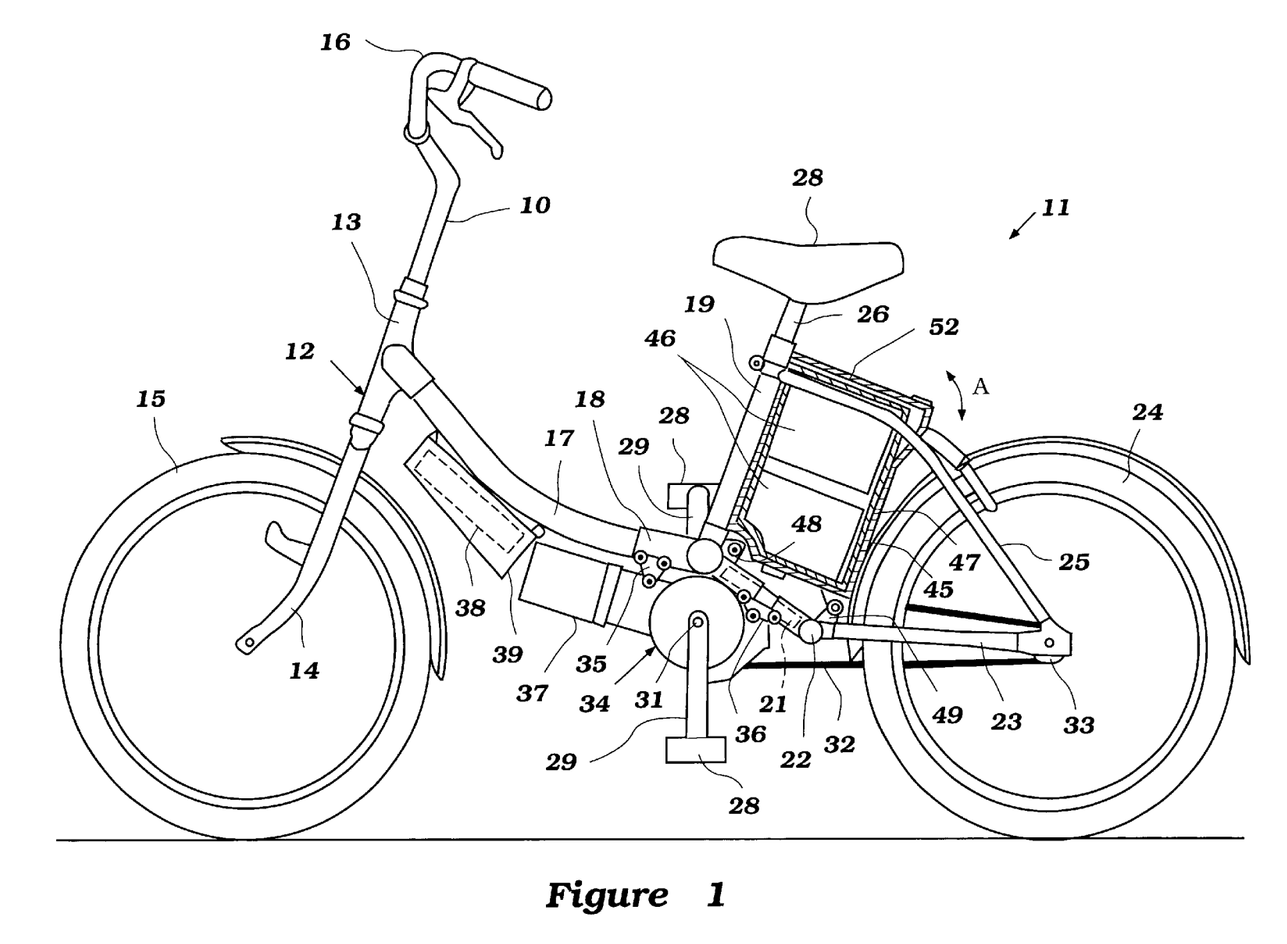
FIG. 1 is a side elevational view of a bicycle having a seat and latching mechanism constructed in accordance with an embodiment of the invention, with a portion broken away and with the body cover removed.
Figure 2:
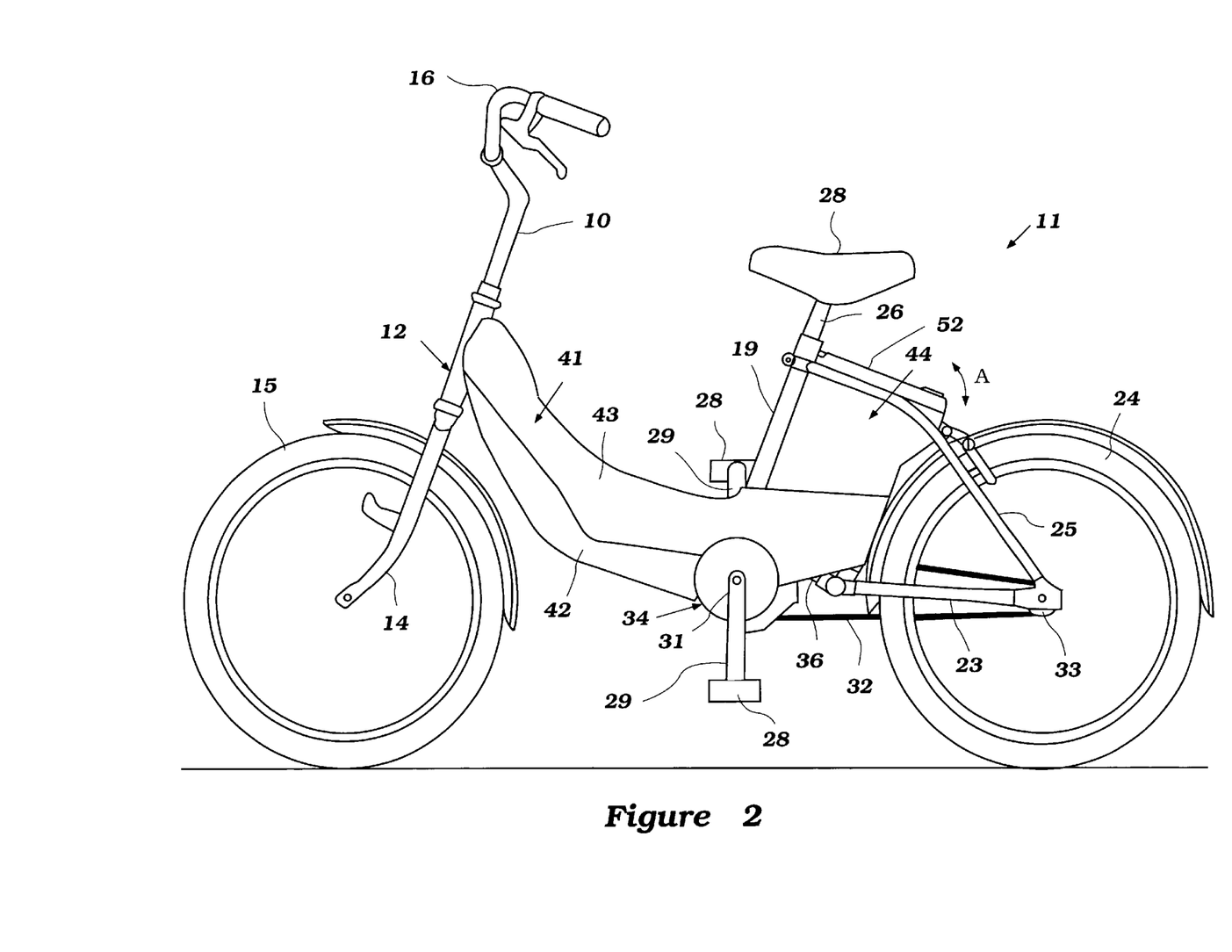
FIG. 2 is a side elevational view, in part similar to FIG. 1, and shows the body cover in place.

Referring now in detail to the drawings and initially to FIGS. 1 and 2, an electrically power assisted bicycle constructed in accordance with an embodiment of the invention is identified generally by the reference numeral 11. As will become apparent, the bicycle 11 is designed to be operated primarily by a rider who applies manual force to a pedal mechanism for driving the bicycle. However, an electric power assist is also provided which includes a torque sensing switch that engages an electric circuit for supplying power to an electric motor to assist the rider in operating the vehicle. The electric motor assist and the way in which it is coupled to the bicycle wheel may be of any type known in the art and reference may be had to any known construction for the details of this portion of the bicycle 11.

The bicycle 11 is comprised of a frame assembly, indicated generally by the reference numeral 12 and which is comprised of a head pipe, 10 that journals a handlebar stem 13 that is coupled to a front fork 14 for steering of the front wheel 15. The front wheel 15 is rotatably journaled on the front fork 14 in any known manner. A handlebar 16 is adjustably connected to the upper end of the handlebar stem 13 for effecting the steering.

A main tube 17 extends downwardly and rearwardly from the head pipe 13 and is connected by means of a bracket 18 at its lower end to a seat pillar 19. A rear tube 21 is connected through a hanger lug 22 to a pair of chain stays 23 which extend rearwardly along opposite sides of a rear wheel 24 journalled by the chain stays. The chain stays 23 have affixed to them a pair of seat stays 25 that extend upwardly and forwardly, and are connected to the upper end of the seat pillar 19 so as to provide a triangular, reinforced structure.

The seat pillar 19 slidably supports a seat post 26 to which a seat 27 is connected, in a manner to be described. The seat 27 is of the saddle type and permits a rider to place his feet on and pedal a pair of pedals 28 each connected to a respective crank arm 29. The crank arms 29 are connected to a crankshaft 31 which is journaled in the frame assembly 12 in a known manner. The crankshaft 31 drives a chain 32 through a sprocket (not shown) and, in turn, drives the rear wheel 24 through a one-way clutch 33.

In addition to this source of manual power, an electric motor assist drive, indicated generally by the reference numeral 34 is mounted on the frame assembly 12 by front and rear brackets 35 and 36. This electric motor assist includes an electric motor 37 which is energized by a control circuit 38 from a source of electric power, to be described, for providing power assist for operating the bicycle 11. The controller 38 is protected within a casing 39.

As has been previously noted, the mechanism is such that, when the operator pedals the pedals 28, his manual input force is measured by a torque sensor or the like. Then, in accordance with any desired and known type of control strategy, the electric motor 37 is energized to provide power assist. The transmission mechanism for coupling the motor 37 to the crankshaft 31 and/or sprocket for driving the chain 32 may be of any type known in this art. Since the details of this construction form no part of the invention, a further description of them is not believed to be necessary to permit those skilled in the art to practice the invention.

As has been noted from the Brief Description of the Drawings, FIG. 1 shows the bicycle 11 with the body cover removed. This body cover is shown in FIG. 2 and is indicated generally by the reference numeral 41. The body cover includes a lower body piece 42 and an upper body piece 43 which, when mated together, cover the controller 38, its supporting and protecting box 39, the electric motor 37 and various other components including the main tube 17.

As has been noted, an electric battery power source is provided for powering the electric motor 37. This battery source is contained within a case assembly, indicated generally by the reference numeral 44 which case assembly may have a construction of the type shown in the co-pending application entitle Battery Holding Structure, Application No. 08/559,624 and this is YAMAH3.296A filed Nov. 20, 1995, in the names of Satoshi Ishikawa, Kazuaki Iwami & Masaru Ohira and assigned to the assignee hereof. Although the construction of the battery case 44 may be of that or other types and reference may be had to that application for a specific type of battery case, the construction will be generally described.

The battery case 44 is comprised of an inner case 45 that contains at least a pair of rechargeable electric batteries 46. An outer case 47 has a casing in which the inner case 45 is received. The outer case 47 is connected to the frame assembly 12 by means of a front bracket 48, a rear bracket 49 and a rear stay 51. The outer case 47 has a cavity which is removably closed by a pivotally supported cover plate 52. The cover plate pivots about a forwardly disposed axis in the direction indicated by the arrow A in order to remove the inner battery case 45 and contained batteries 46 for their servicing and, specifically, their recharging.

The invention deals primarily with the way in which the seat 27 may be pivoted so as to permit opening of the battery case lid 52 and removal of the inner battery case 45 and batteries 46 without encumbrance. This mechanism is shown best in FIGS. 3–6 and will now be described by reference to those figures.

Figure 3:
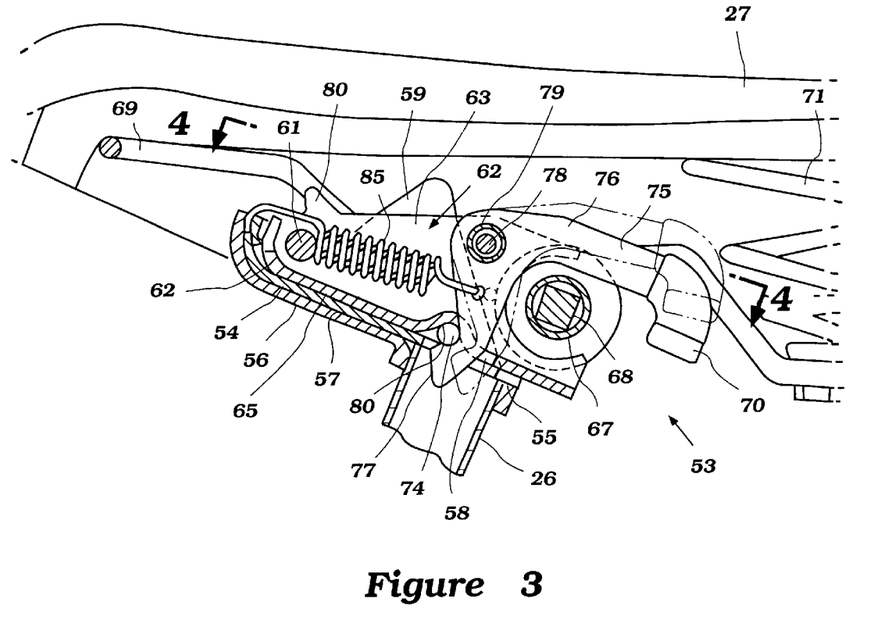
FIG. 3 is an enlarged cross-sectional view taken generally along the line 3—3 of FIG. 4 and shows the latching mechanism for the seat and certain components of the seat in phantom.
Figure 4:
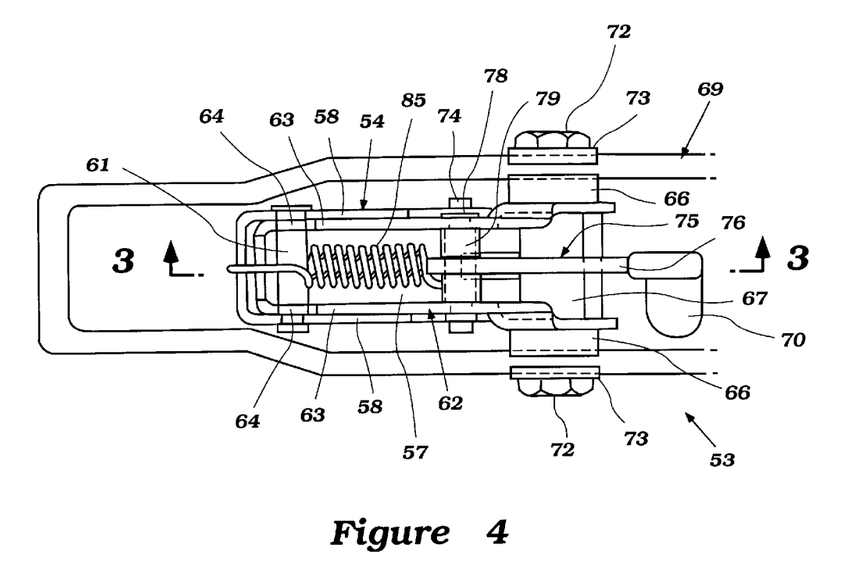
FIG. 4 is a cross-sectional view taken along the line 4—4 of FIG. 3.
Figure 5:
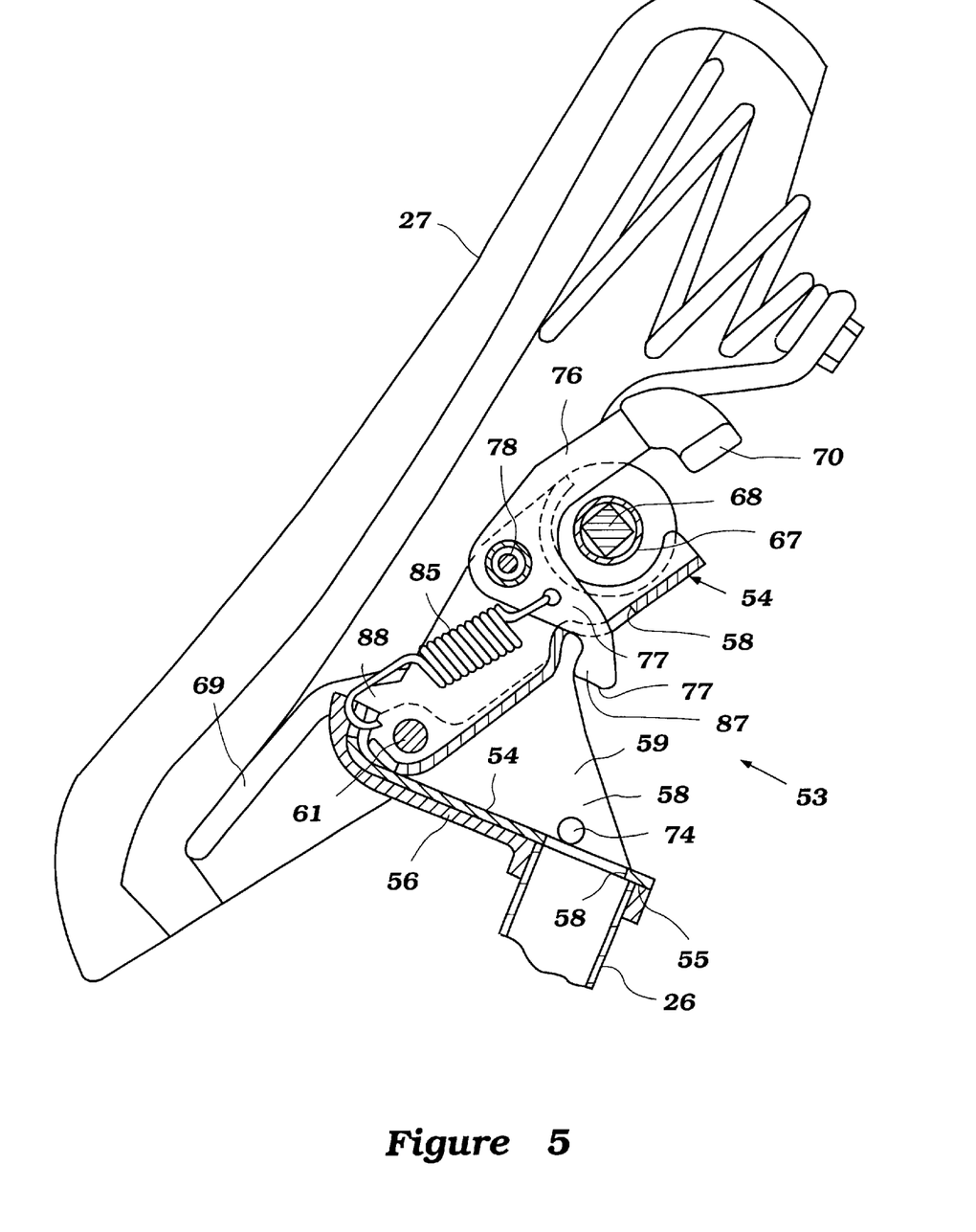
FIG. 5 is a cross-sectional view, in part similar to FIG. 3, but shows the seat in solid and also tilted up to the position wherein the battery case may be accessed for servicing.
Figure 6:
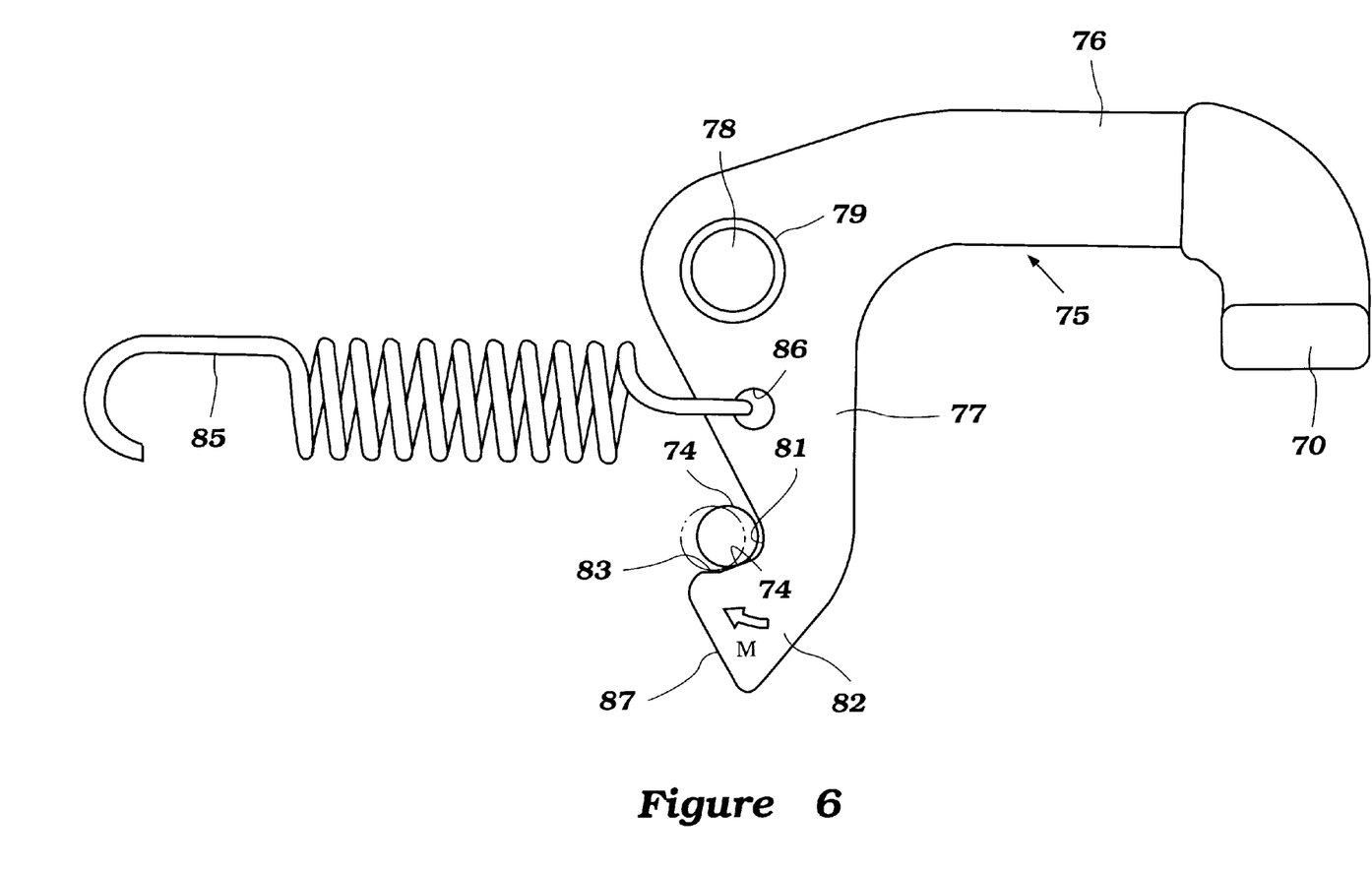
FIG. 6 is a side elevational view showing how the latching mechanism cooperates so as to be maintained in its-latched position.

The seat 27 is supported on the seat post 26 by a seat supporting mechanism, indicated generally by the reference numeral 53 and which permits the seat 27 to be pivoted from its normal riding position as shown in FIGS. 3 and 4 to an access, service position as shown in FIG. 5. The actual latching members are shown in FIG. 6.

The seat supporting mechanism 53 includes a first bracket 54 which is welded, as by a weld bead 55 to the upper end of the tubular seat post 26. In order to prevent the weld bead 55 from engaging the split upper end of the seat pillar 19 and causing damage, a plastic protective plate 56 is affixed to the underside of the bracket 54 in any suitable manner and, thus, provides a neat appearance as well as the aforenoted protection.

The first bracket 54 has a generally horizontally extending portion 57 which defines an opening 58 that is generally aligned with the upper portion of the seat post 26. In top plan view, the bracket 54 has a generally U shape that is comprised of a pair of side portions 58 that have upwardly extending lugs 59 which serve a purpose which will be described. A pivot pin 61 extends transversely across the forward end of the side portions 58.

A second bracket, indicated generally by the reference numeral 62, has a pair of side portions 63 that are nested within the side portions 58 of the first bracket 54. The pin 61 extends through an opening 64 in these side portions 63 so that the bracket 62 is pivotal about an axis defined by the pivot pin 61 which axis extends transversely to the seat post 26 and forwardly thereof.

The second bracket 62 has a lower surface portion 65 that is abuttingly engaged with the upper surface of the first bracket portion 57 when the seat 27 is in its normal riding position. This provides good stability and ensures against noise such as rattling.

The side portions 63 of the second bracket 62 have affixed to them, as by welding, a pair of collars 66. The area between the collars 66 inwardly of the side portions 63 is reinforced by a sleeve 67 that receives a bolt 68. The bolt 68 passes through a seat frame, indicated generally by the reference numeral 69 and to which the seat 27 is affixed in a suitable manner with an interposed spring 71 for cushioning purposes. The seat frame 69 is locked in an adjusted angular position relative to the bracket 62 by means of lock nuts 72 and serrated washers 73 as is well known in this art.

As has been noted, the seat 27 and its frame 69 is pivotal along with the second bracket 62 relative to the first bracket 54 about the pivot pin 61. A latching mechanism, now to be described, is provided for releasably restraining the seat 27 and its frame 69 in the normal riding position as shown in FIGS. 3 and 4.

This latching mechanism is comprised of a latching pin 74 that is affixed to the first bracket side portions 58 in a suitable manner in proximity to the opening 58 in the lower surface 54.

A pivotally supported latching member, indicated generally by the reference numeral 75 has generally the shape of a bell crank and includes a first leg 76 that has an operating handle portion 70 out-turned at its rearward end. The leg 76 is connected to a latching leg 77 at a juncture which is pivotally supported on a pivot pin 78 affixed to the side portions 63 of the second bracket 62. A sleeve 79 is affixed to the lever 75 at this juncture so as to provide a wide bearing surface for the latching member 75.

As may be best seen in FIG. 6, the latch member leg 77 is provided with a notched recess 81 that is formed by a hook-like projection 82 at the lower end of the leg 77. This notched surface 81 is provided by a pair of angularly related portions 83 and 84 as best seen in FIG. 6. When the latch mechanism 75 is in its fully closed positioned, the pin 74 will be captured in the recess 81 and will be held against an arcuate surface 80 formed on the lower surface 65 of the second bracket 62 so as to rigidly retain the seat in its locked position.

It should be noted that the latch member 76 is offset relative to the pivot pin 78 so that it will be urged by gravity to this latched position. In addition, a tension spring 85 has a first end that is hooked into an opening 86 of the latching lever 75 and a second end that is hooked into a recess in the second bracket 54 so as to releasably restraining the latching mechanism in position.

The latching mechanism is released by pivoting the lever handle 70 in a counter clockwise direction so as to pivot the latching lever 75 clear of the pin 74 so that the seat can be also rotated or pivoted in a counter clockwise direction to the position shown in FIG. 5. Since the latching mechanism is carried in major part by the second bracket 62, the entire mechanism will be free of the area over the battery case 44 so that the batteries may be easily replaced.

When moving to the latched position after the batteries have been removed, a cam surface 87 of the hook-like portion 82 of the latching lever 75 will engage the pin 77 and be cammed so that it can, subsequently, engage the pin 74 and hold it in position. In this condition, a portion of the latching portion 82 extends through the opening 58 in the first bracket 54. The inclined surfaces 83 and 84 are configured so as to assist in this latching operation. The gravity bias of the latch 75 and the spring 85 also assist in the latching operation.

It will be seen that the elevated portion 59 of the first bracket 54 offer protection for the latching mechanism and will ensure that the operator's fingers cannot be inadvertently placed into this area where they might be injured.

The second bracket 62 is provided with a pair of lug-like projections 88 that engage an up-turned end of the first bracket 54 so as to limit how far the seat 27 can be pivoted to its open position. As a result of this construction, it should be apparent that the latch mechanism is affected to hold the seat 27 in a firm riding position and yet is easily operable to release the seat 27 to permit it be pivoted to the service position.

Figure 7:
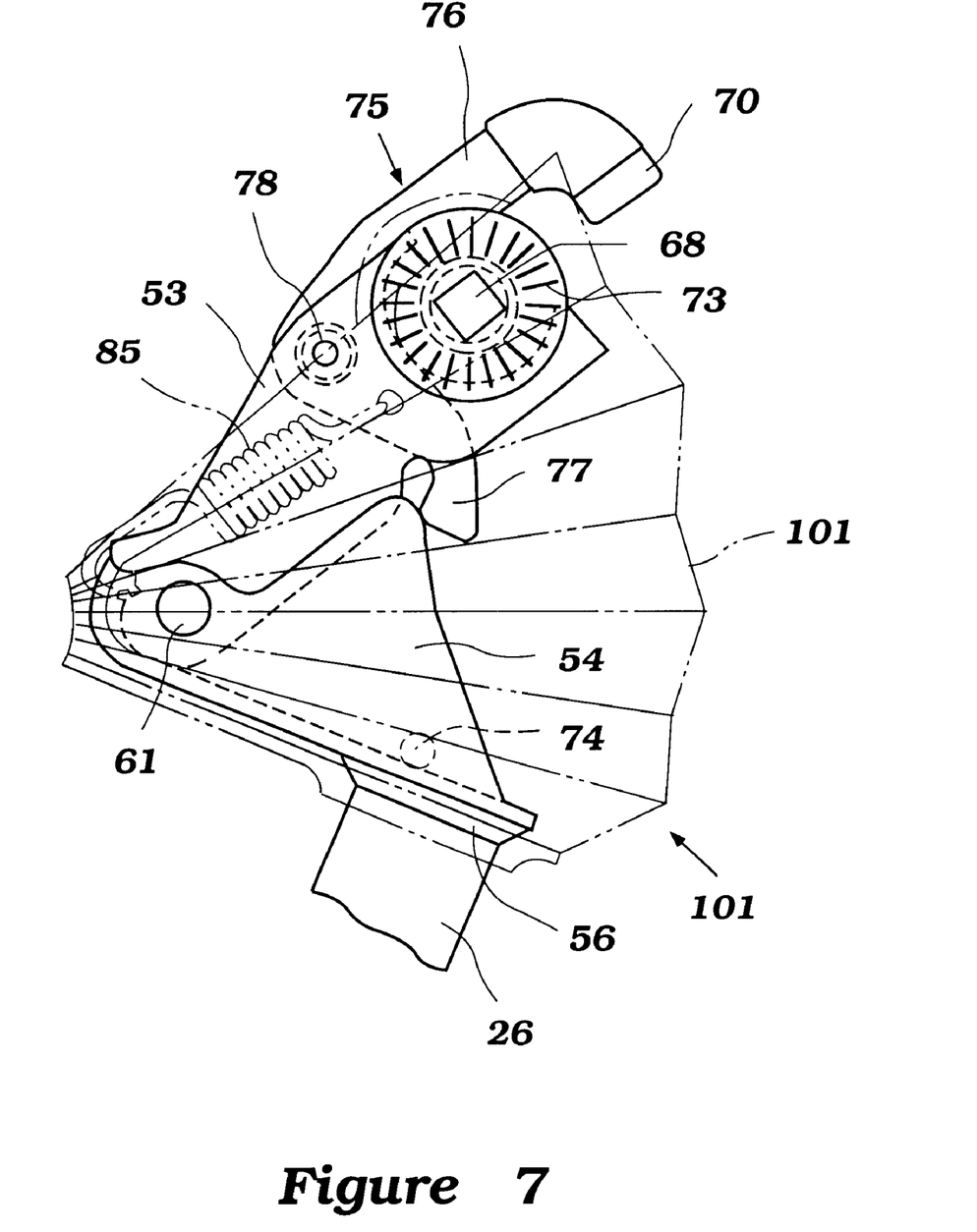
FIG. 7 is a side elevational view, in part similar to FIG. 5, and shows another embodiment of the invention.

FIG. 7 shows another embodiment which employs a latching mechanism that is the same as that already described. In this embodiment, however, a flexible boot 101 is provided that encircles the entire latching mechanism, except for the latching handle portion 77 and, thus, offers firther protection against the elements.

Thus, from the foregoing description, it should be readily apparent that the described embodiments provide a very effective seat mechanism for an electric power assisted bicycle wherein the batteries can be easily removed for servicing. Of course, the foregoing description is that of preferred embodiments of the invention and various changes and modifications may be made without departing from the spirit and scope of the invention, as defined by the appended claims.

What is claimed is:

1. A pivotal saddle-type seat for a vehicle having a seat post, a first bracket affixed to an upper end of said seat post, a second bracket supported by said first bracket for pivotal movement about a first pivot axis extending transversely to said seat post, a saddle-type seat fixed relative to said second bracket, and selectively operable latching means for detachably retaining said seat in a normal riding position when in a selected latched position or permitting pivoting of said second bracket and said seat to a service position when in a selected released position comprised of a first latching member affixed to said first bracket and a second selectively releasable latching member carried by said second bracket and cooperating with said first latching member when in a latched position for retaining said seat in its normal riding position, said second latching member being selectively moveable to a released position free of engagement with said first latching member when said seat is in a normal riding position.

2. A pivotal saddle-type seat as set forth in claim 1, wherein the first latching member comprises a latching surface fixed relative to the first bracket and wherein the second latching member comprises a pivotally supported latch supported for pivotal movement by the second bracket about a second pivot axis extending parallel to said first pivot axis, said pivotally supported latch having a keeper portion engaged with said latching surface when said seat is in a riding position.

3. A pivotal saddle-type seat as set forth in claim 2, further including means for biasing the pivotally supported latch to a latched position.

4. A pivotal saddle-type seat as set forth in claim 3, wherein the means for biasing the pivotally supported latch comprises a gravity bias effected by an offset of the center of gravity relative to the second pivot axis in a direction for effecting pivotal movement of the pivotally supported latch in a latched position.

5. A pivotal saddle-type seat as set forth in claim 3, wherein the means for biasing the pivotally supported latch comprises a spring.

6. A pivotal saddle-type seat as set forth in claim 5, wherein the means for biasing the pivotally supported latch further comprises a gravity bias affected by an offset of the center of gravity relative to the second pivot axis in a direction for effecting pivotal movement of the latching member in a latched position.

7. A pivotal saddle-type seat as set forth in claim 6, wherein the first bracket has a pair of upstanding side portions that nestingly protect the latching means.

8. A pivotal saddle-type seat as set forth in claim 2, wherein the first and second brackets have abutting surfaces when the seat is in a latched position for resisting rattling.

9. A pivotal saddle-type seat as set forth in claim 8, wherein the first pivotal axis is disposed forwardly of the second pivotal axis.

10. A pivotal saddle-type seat as set forth in claim 9, wherein the seat is pivotally supported to the second bracket about a third pivot axis for adjustment with the third pivot axis being disposed rearwardly of the first and second pivot axes.

11. A pivotal saddle-type seat as set forth in claim 10, further including means for biasing the pivotally supported latch to a latched position.

12. A pivotal saddle-type seat as set forth in claim 11, wherein the means for biasing the pivotally supported latch comprises a gravity bias affected by an offset of the center of gravity relative to the second pivot axis in a direction for effecting pivotal movement of the pivotally supported latch in a latched position.

13. A pivotal saddle-type seat as set forth in claim 12, wherein the means for biasing the pivotally supported latch comprises a spring.

14. A pivotal saddle-type seat as set forth in claim 13, wherein the means for biasing the pivotally supported latch further comprises a gravity bias affected by an offset of the center of gravity relative to the second pivot axis in a direction for effecting pivotal movement of the pivotally supported latch in a latched position.

15. A pivotal saddle-type seat as set forth in claim 14, wherein the first bracket has a pair of upstanding side portions that nestingly protect the latching means.

16. A bicycle incorporating a pivotal saddle-type seat as set forth in claim 2, said bicycle having a frame that supports the seat post, a dirigible front wheel and a pedal-operated rear wheel and further including an electric motor assist for assisting in the driving of the driven rear wheel and powered by a battery.

17. A bicycle as set forth in claim 16, wherein the battery is supported in a battery box carried by the frame and disposed beneath the seat in the normal riding position of the seat so that a battery can not be removed from the battery box when said seat is in a normal riding position, said seat being positioned in spaced relation to said battery box when said seat is in a service position so that a battery can be removed from said battery box.

18. A bicycle as set forth in claim 17, wherein the battery box is disposed to the rear of the seat.

19. A pivotal saddle-type seat as set forth in claim 2, wherein the latching surface is formed by a pin affixed to the first bracket.

\* \* \* \* \*

UNITED STATES PATENT AND TRADEMARK OFFICE
CERTIFICATE OF CORRECTION

PATENT NO. : 6,382,651 B1
DATED : May 7, 2002
INVENTOR(S) : Ryuichi Enda

It is certified that error appears in the above-identified patent and that said Letters Patent is hereby corrected as shown below:

Column 5,
Line 43, delete "firther" and insert -- further --.

Column 6,
Lines 31 and 32, delete "latching member" and insert -- pivotally supported latch --.

Signed and Sealed this

Eighth Day of October, 2002

Attest:

Attesting Officer

JAMES E. ROGAN
*Director of the United States Patent and Trademark Office*